US007456831B2

United States Patent
Chu et al.

(10) Patent No.: US 7,456,831 B2
(45) Date of Patent: Nov. 25, 2008

(54) METHOD FOR GENERATING 3D MESH BASED ON UNORGANIZED SPARSE 3D POINTS

(75) Inventors: Chang-Woo Chu, Daejon (KR); Bon-Ki Koo, Daejon (KR); Jea-Chul Kim, Daejon (KR); Byoung-Tae Choi, Daejon (KR); Hyun-Bin Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 448 days.

(21) Appl. No.: 11/205,427

(22) Filed: Aug. 17, 2005

(65) Prior Publication Data

US 2006/0152506 A1 Jul. 13, 2006

(30) Foreign Application Priority Data

Dec. 13, 2004 (KR) ...................... 10-2004-0104859

(51) Int. Cl.
*G06T 17/00* (2006.01)
(52) U.S. Cl. ....................................... 345/420; 345/618
(58) Field of Classification Search ........................ None
See application file for complete search history.

(56) References Cited

U.S. PATENT DOCUMENTS

| 4,987,554 | A | * | 1/1991 | Kaufman | 345/424 |
| 5,929,860 | A | * | 7/1999 | Hoppe | 345/419 |
| 6,208,347 | B1 | * | 3/2001 | Migdal et al. | 345/419 |
| 6,278,460 | B1 | * | 8/2001 | Myers et al. | 345/424 |
| 6,384,826 | B1 | | 5/2002 | Bern et al. | |
| 6,549,201 | B1 | * | 4/2003 | Igarashi et al. | 345/423 |
| 6,844,876 | B2 | * | 1/2005 | Uesaki et al. | 345/419 |
| 6,943,789 | B2 | * | 9/2005 | Perry et al. | 345/420 |

(Continued)

FOREIGN PATENT DOCUMENTS

KR 20020041387 6/2002

(Continued)

OTHER PUBLICATIONS

Attene et al. Automatic Surface Reconstruction From Point Sets in Space. Computer Graphics Forum. vol. 19. No. 3. Sep. 2000.*

(Continued)

*Primary Examiner*—Ulka Chauhan
*Assistant Examiner*—Peter-Anthony Pappas
(74) *Attorney, Agent, or Firm*—Ladas & Parry LLP

(57) ABSTRACT

Provided is a method for generating a three-dimensional (3D) mesh based on unorganized sparse 3D points to generate a mesh model that displays a 3D surface by using unorganized sparse 3D points extracted from a plurality of two-dimensional image. The 3D mesh generating method based on unorganized sparse 3D points includes the steps of: receiving a plurality of unorganized sparse 3D points, a plurality of two-dimensional (2D) corresponding point information, and images; generating an initial mesh by using the received 2D corresponding information; removing an abnormal face from the initial mesh; checking if unused 2D corresponding point information exists among the received 2D corresponding point information; if unused 2D corresponding point information exists, reorganizing the initial mesh by performing a constrained Delaunay triangulation; and if unused 2D corresponding point information does not exist in the result of the confirmation, generating a final mesh.

4 Claims, 3 Drawing Sheets

U.S. PATENT DOCUMENTS

| 7,023,432 | B2* | 4/2006 | Fletcher et al. | 345/419 |
| 2003/0052875 | A1* | 3/2003 | Salomie | 345/419 |
| 2005/0128211 | A1* | 6/2005 | Berger et al. | 345/582 |

FOREIGN PATENT DOCUMENTS

| KR | 20030051997 | 6/2003 |

OTHER PUBLICATIONS

Sun et al. Mesh-based Integration of Range and Color Images. Sensor Fusion: Architectures, Algorithms and Applications IV. 2000.*

Sarti et al. Image-Based Surface Modeling: A Multi-Resolution Approach. Signal Processing. vol. 82. Issue 9. 2002.*

Zhang et al. Image-Based Multiresolution Modeling by Surface Deformation. Technical Report. Carnegie Mellon University. Jan. 2000.*

Isidoro et al. Stochastic Mesh-Based Multiview Reconstruction. First International Symposium on 3D Data Processing Visualization and Transmission. 2002.*

Debevec et al. Modeling and Rendering Architecture from Photographs: A Hybrid Geometry and Image-Based Approach. International Conference on Computer Graphics and Interactive Techniques. 1996.*

'Fast Triangulation of Terrain Data through Unique Point Extraction' Jeon et al., Korean Journal of Remote Sensing, vol. 19, No. 6, 2003, pp. 457-464.

'Image-Consistent Surface Triangulation' Morris et al., IEEE Computer Vision and Pattern Reconstruction 2000, vol. 1, pp. 332-338, Jun. 13-15, Hilton Head, SC.

'Surface Reconstruction from Unorganized Points' Hoppe et al., University of Washington, Department of Computer Science and Engineering, Department of Mathematics, Department of Statistics, SCM Siggraph, vol. 26, No. 2, Jul. 1992, pp. 71-78.

* cited by examiner

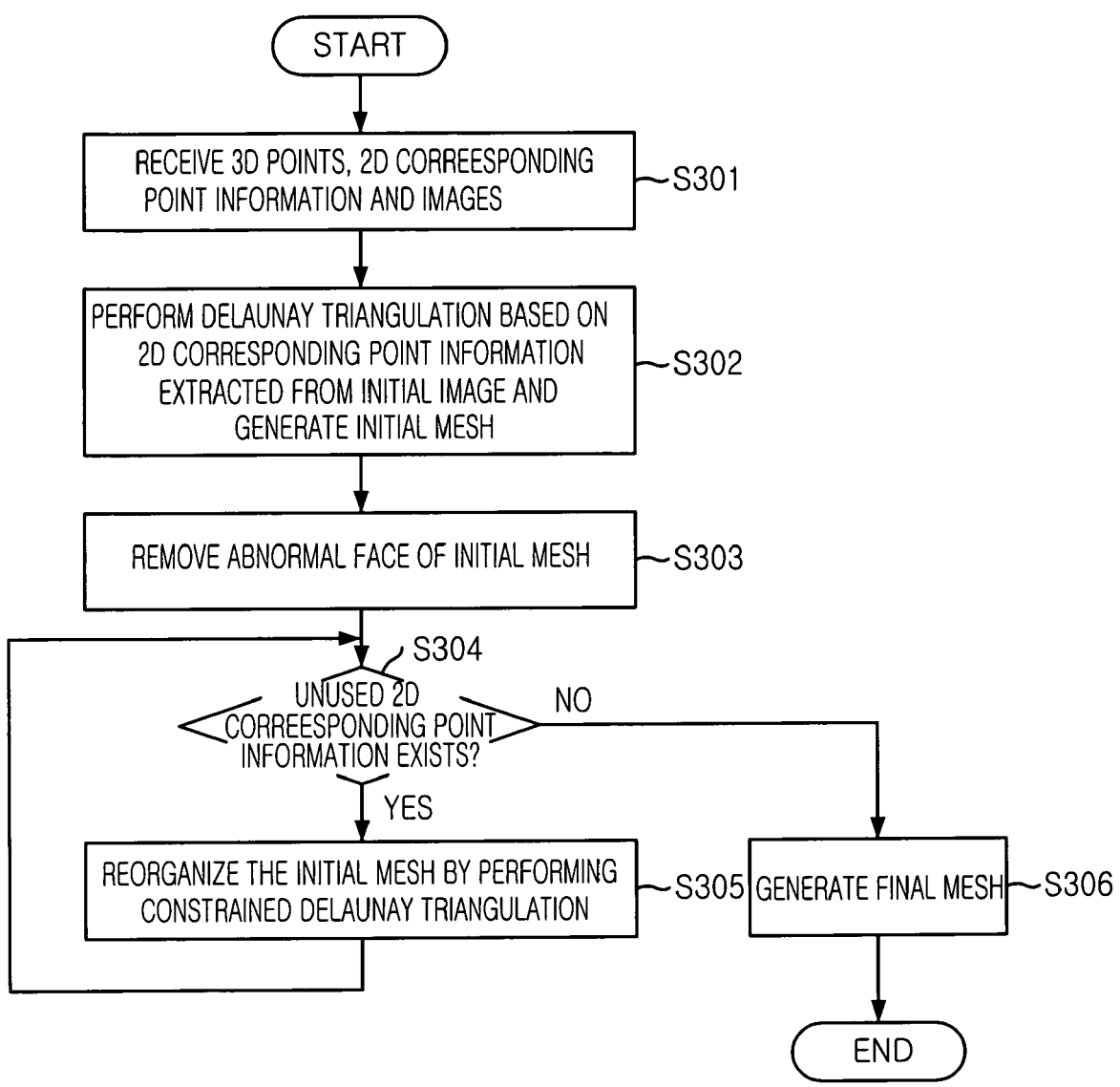

METHOD FOR GENERATING 3D MESH BASED ON UNORGANIZED SPARSE 3D POINTS

FIELD OF THE INVENTION

The present invention relates to a method for generating a three-dimensional (3D) mesh based on unorganized sparse 3D points; and, more particularly, to a 3D mesh generating method based on unorganized sparse 3D points to generate a mesh model that displays a 3D surface by using unorganized sparse 3D points extracted from a plurality of two-dimensional image.

DESCRIPTION OF RELATED ART

Unorganized three-dimensional (3D) points of the present invention are not 3D points that have a special relationship between the points such as a range image or a contour line, but the unorganized 3D points mean 3D points that do not have any relationship between them, just as 3D points data extracted from a 3D digitizer.

Also, the fact that the unorganized 3D points are not dense means that the 3D points are not measured by using a digitizer such as a 3D scanner, but extracted through a modeling device which extracts a camera parameter by using corresponding points of many images and measures coordinates of 3D points based on the camera parameter by using the procedure that.

Also, the coordinates of the 3D points mean the coordinates in the 3D space produced from 2D images completed with that the camera compensation.

Meanwhile, several methods have been suggested to reorganize the mesh in the unorganized sparse 3D points.

First, the method suggested by Hoppe includes the steps of finding several nearest points from an arbitrary measurement point, estimating a normal direction of each point, calculating a decoded distance, applying a transformed marching cube algorithm to the calculated distance and extracting a surface mesh.

Second, a 3D mesh reorganizing method following a cube shrink-wrapping method includes the steps of finding a minimum rectangle including all points, dividing 6 faces of the rectangle equally in an arbitrary precision, putting the divided faces as an initial mesh, minimizing the mesh in the direction of points continuously and finding a face mesh of an object.

Since the method reorganizes the faces of the object in the 3D point obtained from the digitizer measuring the object faces densely, such as a 3D scanner, it has a shortcoming that a sparse input cannot be processed.

Generally, an image-based modeling software should necessarily go through a procedure reorganizing a 3D mesh from the unorganized sparse 3D points sequentially to generate a final mesh.

Therefore, the conventional image-based modeling software following the conventional method generates the final mesh by separately receiving data from a user whenever it forms the final mesh, or reorganizing a mesh automatically within limitations.

Besides, the image-based modeling software has generated the final mesh without a mesh reorganizing procedure by matching the mesh of a basic figure, which is commonly seen in an actual environment, e.g., a hexahedron and a globe, to the image and editing the mesh.

Meanwhile, a conventional method generating a 3D mesh based on unorganized sparse 3D points has been suggested by D. Morris and T. Kanade.

To describe it in detail, the 3D initial mesh and a texture of each face are calculated by using corresponding points of one 2D image, and an error with the original image is calculated by perspectively re-projecting the mesh into the image.

Subsequently, it is calculated how many errors can be reduced compared with the error of the initial mesh, assuming that edge swapping is performed with respect to every available edge of the initial mesh.

The edge that can reduce the errors to the least is chosen and swapped, and the error of the mesh is calculated again.

The final mesh is generated by repeating the procedure until there is no edge to be swapped to reduce the errors.

However, the conventional method has a problem that it can be fallen into local minima by repeating the procedure for reducing the errors.

In case of reorganizing faces by measuring an object having an occlusion or whole object, i.e., when all points do not appear in one image, the conventional method also has a problem that 3D mesh cannot be reorganized.

Referring to FIG. 1, a 3D mesh generating method based on unorganized sparse 3D points following another conventional method will be described in detail.

At step S101, a plurality of images which capture the target object in various positions are read from computer-readable recording medium.

At step S102, internal parameters of a camera, relative position and a posture of the cameras of the time when each image is photographed are extracted from the input images.

At step S103, if a corresponding point used for generating a 3D mesh model based on a correction result of the camera is determined by a user, 3D coordinates are calculated by using a triangulation method. Herein, if a fact that an epipolar line going through the specific point is drawn in the other images due to epipolar constraint when the specific point is set in a piece of image is used.

At step S104, the 3D mesh is generated based on the coordinates of the 3D points.

The conventional 3D mesh generating method based on the unorganized sparse 3D points has a problem that the 3D points forming one face of the mesh should be separately designated by a user each time when a final mesh is generated.

SUMMARY OF THE INVENTION

It is, therefore, an object of the present invention to provide a three-dimensional (3D) mesh generating method based on unorganized sparse 3D points that can minimize a manual work required to generate a 3D mesh model based on image information by performing three steps. The first step is to generate an initial mesh by using two-dimensional (2D) corresponding point information extracted in an initial image including a maximum of the unorganized sparse 3D points. The second step is to remove an abnormal face of the initial mesh by using a texture, i.e., color information of an image, extracted in the initial image. The third step is to generate a final mesh by performing a constrained Delaunay triangulation with the rest images sequentially.

Other objects and aspects of the invention will be understood by the following description and become more apparent from the embodiments in accordance with the present invention, which is set forth hereinafter. It will be also apparent that objects and aspects of the invention can be embodied easily by the means and combinations thereof defined in the claims.

In accordance with an aspect of the present invention, there is provided a 3D mesh generating method based on unorganized sparse 3D points, including the steps of: receiving a plurality of unorganized sparse 3D points, a plurality of 2D corresponding point information, and images; generating an initial mesh by using the received 2D corresponding information; removing an abnormal face from the initial mesh; checking if unused 2D corresponding point information exists among the received 2D corresponding point information; if unused 2D corresponding point information exists, reorganizing the initial mesh by performing a constrained Delaunay triangulation; and if unused 2D corresponding point information does not exist in the result of the confirmation, generating a final mesh.

Other objects and advantages of the present invention will become apparent from the following description of the embodiments with reference to the accompanying drawings, therefore, those skilled in the art that the present invention is included can embody the technological concept and scope of the invention easily. In addition, if it is considered that detailed description on the prior art blurs the point of the present invention, the detailed description will not be provided herein. The preferred embodiments of the present invention will be described in detail hereinafter with reference to the attached drawings.

BRIEF DESCRIPTION OF THE DRAWINGS

The above and other objects and features of the present invention will become apparent from the following description of the preferred embodiments given in conjunction with the accompanying drawings, in which:

FIG. 3 is a flowchart describing a 3D mesh generating method based on unorganized sparse 3D points in accordance with an embodiment of the present invention.

DETAILED DESCRIPTION OF THE INVENTION

Other objects and aspects of the invention will become apparent from the following description of the embodiments with reference to the accompanying drawings, which is set forth hereinafter.

Figure 1:
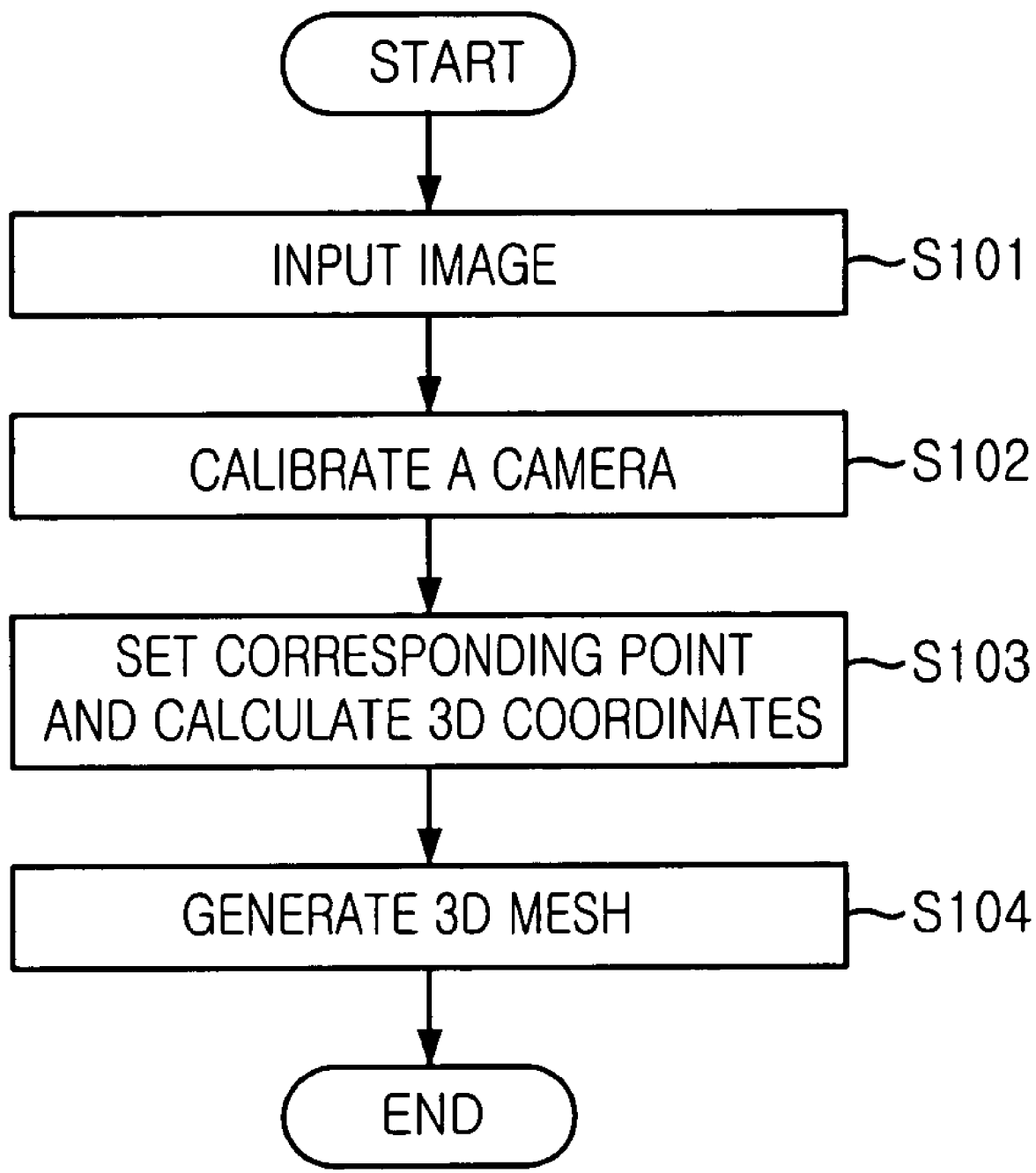
FIG. 1 is a flowchart showing a conventional 3D mesh generating method based on unorganized sparse three-dimensional (3D) points following a conventional method.
Figure 2:
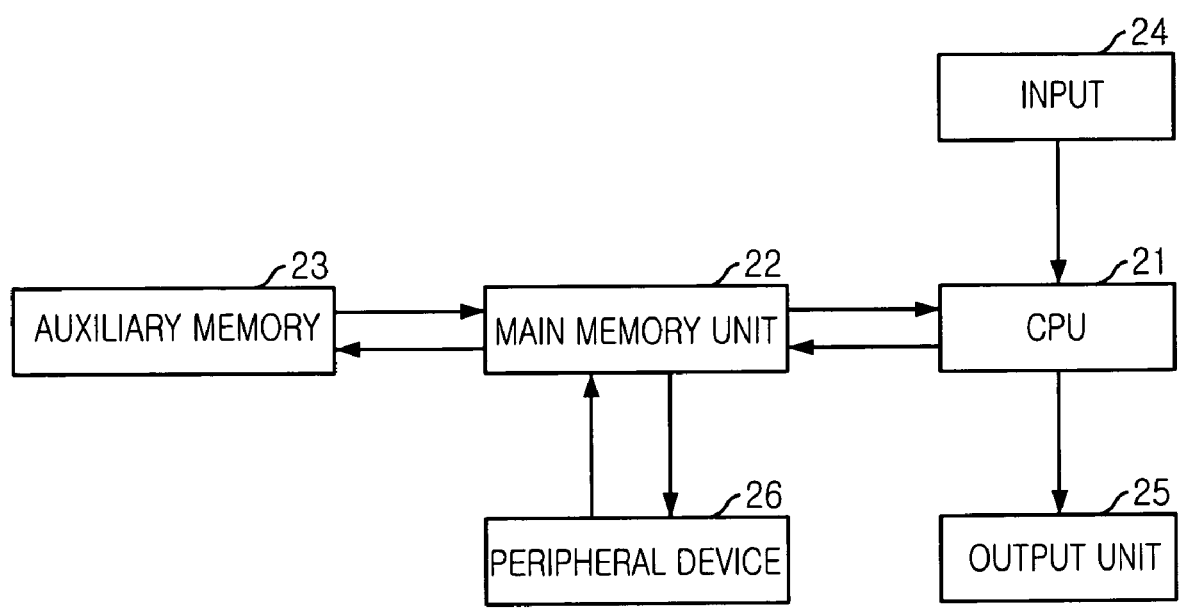
FIG. 2 is a block diagram illustrating a general hardware system to which the present invention is applied.

FIG. 2 is a block diagram illustrating a general hardware system to which the present invention is applied.

As shown in FIG. 2, the hardware system includes a central processing unit (CPU) 21, a main memory 22 connected to the CPU 21, an auxiliary memory 23 connected to the main memory 22, input/output units 24 and 25 connected to the CPU 21 and a peripheral device 26 connected to the main memory 22.

In the hardware system including the CPU 21, the main memory 22, the auxiliary memory 23, the input/output units 24 and 25, and the peripheral device 26, the CPU controls and manages the whole system of a computer. The main memory 22 and the auxiliary memory 23 store a program performed in the CPU 21 and various data used or generated while working. The input/output units 24 and 25 receive/transmit data from/to a user. The peripheral device 26 is for a communication interface.

The auxiliary memory 23 stores massive data, and the input unit 24 and output unit 25 include a general keyboard, a display device and a printer.

Since a computer hardware environment having the structure is a well-known technology, a detailed description on it will not be provided herein. The main memory 22 of the hardware system stores a program to be able to generate a final 3D mesh from the coordinates of arbitrary unorganized sparse 3D points, and the program is performed according to the control of the CPU 21.

The program finds the initial mesh by obtaining the initial mesh from an image having a maximum of corresponding points preferentially, removing an erroneously generated face by using color information of the image, and generating the final mesh according to a method completing the mesh little by little by adding the corresponding point of the other image to the rest mesh.

FIG. 3 is a flowchart illustrating the 3D mesh generating method based on the unorganized sparse 3D points in accordance with an embodiment of the present invention.

At step S301, a plurality of unorganized sparse 3D points, a plurality of 2D corresponding information, or coordinates, and images are received. Herein, the 2D corresponding point information is the information extracted from the image.

At step S302, the initial mesh is generated by performing the Delaunay triangulation based on the received 2D corresponding point information.

That is, the initial mesh is generated by performing the Delaunay triangulation based on the 2D corresponding point coordinates extracted from the initial image that includes a maximum of the 3D points among the received 2D corresponding point information. Herein, since the triangulation is performed by only the 2D corresponding point coordinates, the initial mesh generated through the triangulation includes the erroneously generated face.

At step S303, the abnormal face is removed from the initial mesh.

That is, the texture of each face in the initial mesh is obtained based on the initial image, and the texture of each face in the initial mesh is compared with the texture of the face corresponding to the face of the initial mesh extracted in the other image photographing in the other position.

If the compared textures are the same in the comparison result, the face of the initial mesh is determined as a normal face and maintained. Otherwise the edge is swapped with respect to neighboring three faces, and the texture of each face is re-compared with the texture of a corresponding face in the image photographing in another position.

If the textures are the same in the re-comparison result, the face of the mesh exchanging the edge is determined as a normal face and maintained, otherwise, the face is determined as an abnormal face and removed.

At step S304, it is checked if unused 2D corresponding point information exists among a plurality of the received 2D corresponding point information.

At step S305, if it turns out in the result of the step S304 that the unused 2D corresponding point information exists, the initial mesh is reorganized by performing the constrained Delaunay triangulation. At step S306, if the unused 2D corresponding point information does not exist, the final mesh is generated.

That is, the normal face is maintained in the generated mesh and the mesh is reorganized by deciding a connection relationship between the 2D corresponding point information, or coordinates, extracted from a next image and the 2D corresponding points which are free from the connection relationship in the initial image, Although the erroneously generated face is removed in the initial mesh generated in the initial image and the Delaunay triangulation is performed on the remaining edges based on the 2D corresponding point included in the image photographed in another position, the connected relationship of the corresponding point is maintained. Herein, the method deciding the connection relationship of the rest points based on a pre-determined edge is called the constrained Delaunay triangulation method.

Subsequently, just as in the first image, the abnormal face is removed by comparing the texture of each face of the mesh, i.e., the color information of the corresponding face in the each image.

A final 3D mesh model is obtained by repeating the procedure to all images, i.e., the 2D corresponding point information extracted from the images.

As described above, the method of the present invention can be embodied as a program and stored in a computer-readable recording medium, such as CD-ROM, RAM, ROM, a floppy disk, a hard disk and a magneto-optical disk. Since the process can be easily implemented by those skilled in the art, further description will not be provided herein.

Although not all 3D points are included in one image, the present invention can generate the final mesh by generating the initial mesh based on the 2D corresponding point information extracted from the initial image which includes a maximum of the unorganized sparse 3D points, removing the abnormal face of the initial mesh based on the texture, i.e., the color information of the image extracted from the initial image, and generating the final mesh by performing the constrained Delaunay triangulation with the other images sequentially.

The present application contains object matter related to Korean patent application No. 2004-0104859, filed in the Korean Intellectual Property Office on Dec. 13, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for generating a three-dimensional (3D) mesh based on unorganized sparse 3D points, comprising the steps of:
   a) receiving a plurality of unorganized sparse 3D points, a plurality of two-dimensional (2D) corresponding point information, and a plurality of images;
   b) generating an initial mesh by using the received 2D corresponding information of an initial image;
   c) detecting and removing an abnormal face from the initial mesh by comparing a face texture of the initial mesh with a face texture of a subsequent image corresponding to the face of the initial mesh, wherein if the textures are not the same re-comparing the texture of each face of the initial mesh with the texture of a corresponding face in an image photographed in another position and exchanging an edge with respect to neighboring three faces;
   d) determining if unused 2D corresponding point information exists among the received 2D corresponding point information of the plurality of images when said received 2D corresponding point information is compared to the 2D corresponding point information of a mesh in which the abnormal face is removed from the initial mesh;
   e) if unused 2D corresponding point information exists among the plurality of images, reorganizing the mesh by performing a constrained Delaunay triangulation; and
   f) if unused 2D corresponding point information does not exist among the plurality of images when compared to the mesh, generating a final 3D mesh.

2. The method as recited in claim 1, wherein, in the step b), the initial mesh is generated by using 2D corresponding point information extracted from the initial image having a maximum number of the unorganized sparse 3D points.

3. The method as recited in claim 1, wherein the step c) includes the steps of:
   c1) obtaining a texture of each face in the initial mesh by using the initial image;
   c2) comparing the texture of each face in the initial mesh with the texture of a face of another image which corresponds to the face of the initial mesh;
   c3) if the textures are the same, determining the face of the initial mesh as a normal face and maintaining the face of the mesh with the swapped edge; and
   c4) if the textures are not same, removing the face of the initial mesh by determining the face the initial mesh as the abnormal face.

4. The method recited in claim 3, wherein in the step e) the mesh is reorganized based on connection relationship between the 2D corresponding point information or coordinates extracted from a next image of the plurality of images and 2D corresponding points which are free from the connection relationship in the initial image, while a normal face is maintained in the generated mesh.

* * * * *